(12) United States Patent
Kim et al.

(10) Patent No.: US 10,904,065 B2
(45) Date of Patent: Jan. 26, 2021

(54) METHOD AND DEVICE FOR PERFORMING SIDELINK COMMUNICATION IN WIRELESS COMMUNICATION SYSTEM

(71) Applicant: LG ELECTRONICS INC., Seoul (KR)

(72) Inventors: Myoungseob Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/645,415

(22) PCT Filed: Sep. 7, 2018

(86) PCT No.: PCT/KR2018/010510
§ 371 (c)(1),
(2) Date: Mar. 6, 2020

(87) PCT Pub. No.: WO2019/050339
PCT Pub. Date: Mar. 14, 2019

(65) Prior Publication Data
US 2020/0287771 A1    Sep. 10, 2020

Related U.S. Application Data

(60) Provisional application No. 62/555,679, filed on Sep. 8, 2017.

(51) Int. Cl.
*H04L 5/12*        (2006.01)
*H04L 27/34*       (2006.01)
(Continued)

(52) U.S. Cl.
CPC .............. *H04L 27/34* (2013.01); *H04L 27/18* (2013.01); *H04W 72/0446* (2013.01); *H04W 92/18* (2013.01)

(58) Field of Classification Search
CPC .... H04L 27/34; H04L 27/18; H04W 72/0446; H04W 92/18
(Continued)

(56) References Cited

U.S. PATENT DOCUMENTS

2002/0118772 A1* 8/2002 Lin ..................... H04L 27/3405
375/285
2004/0192218 A1* 9/2004 Oprea ............... H04L 25/03343
455/73

(Continued)

FOREIGN PATENT DOCUMENTS

KR    20130122201    11/2013
WO    2017/028764    2/2017

OTHER PUBLICATIONS

PCT International Application No. PCT/KR2018/010510, International Search Report dated Jan. 3, 2019, 3 pages.

*Primary Examiner* — Don N Vo
(74) *Attorney, Agent, or Firm* — Lee Hong Degerman Kang Waimey

(57) ABSTRACT

Disclosed are a method and a device for performing sidelink communication in a wireless communication system. Specifically, the method performed by a first terminal may comprise a step of transmitting a specific sidelink message including at least one piece of information among first information and second information to a second terminal, wherein: a transmission period of the first information is set to be longer than a transmission period of the second information; a first modulation order to be applied to the first information and a second modulation order of the second information are set differently from each other; and when the first information and the second information are concurrently transmitted through the specific sidelink message, modulation symbols of the first information and modulation symbols of the second information are mapped by consid- (Continued)

ering a requirement noise ratio for each of the first modulation order and the second modulation order.

12 Claims, 13 Drawing Sheets

(51) Int. Cl.
*H04L 27/18* (2006.01)
*H04W 72/04* (2009.01)
*H04W 92/18* (2009.01)

(58) Field of Classification Search
USPC .......................................................... 375/261
See application file for complete search history.

(56) References Cited

U.S. PATENT DOCUMENTS

| | | | |
|---|---|---|---|
| 2007/0010268 A1* | 1/2007 | Kim | H04L 1/0003 455/509 |
| 2010/0046644 A1 | 2/2010 | Mazet | |
| 2015/0156050 A1 | 6/2015 | Nishimoto et al. | |
| 2016/0309542 A1 | 10/2016 | Kowalski et al. | |
| 2020/0153538 A1* | 5/2020 | Chen | H04L 1/0023 |
| 2020/0154372 A1* | 5/2020 | Chae | H04W 52/383 |

\* cited by examiner

[Fig. 1]
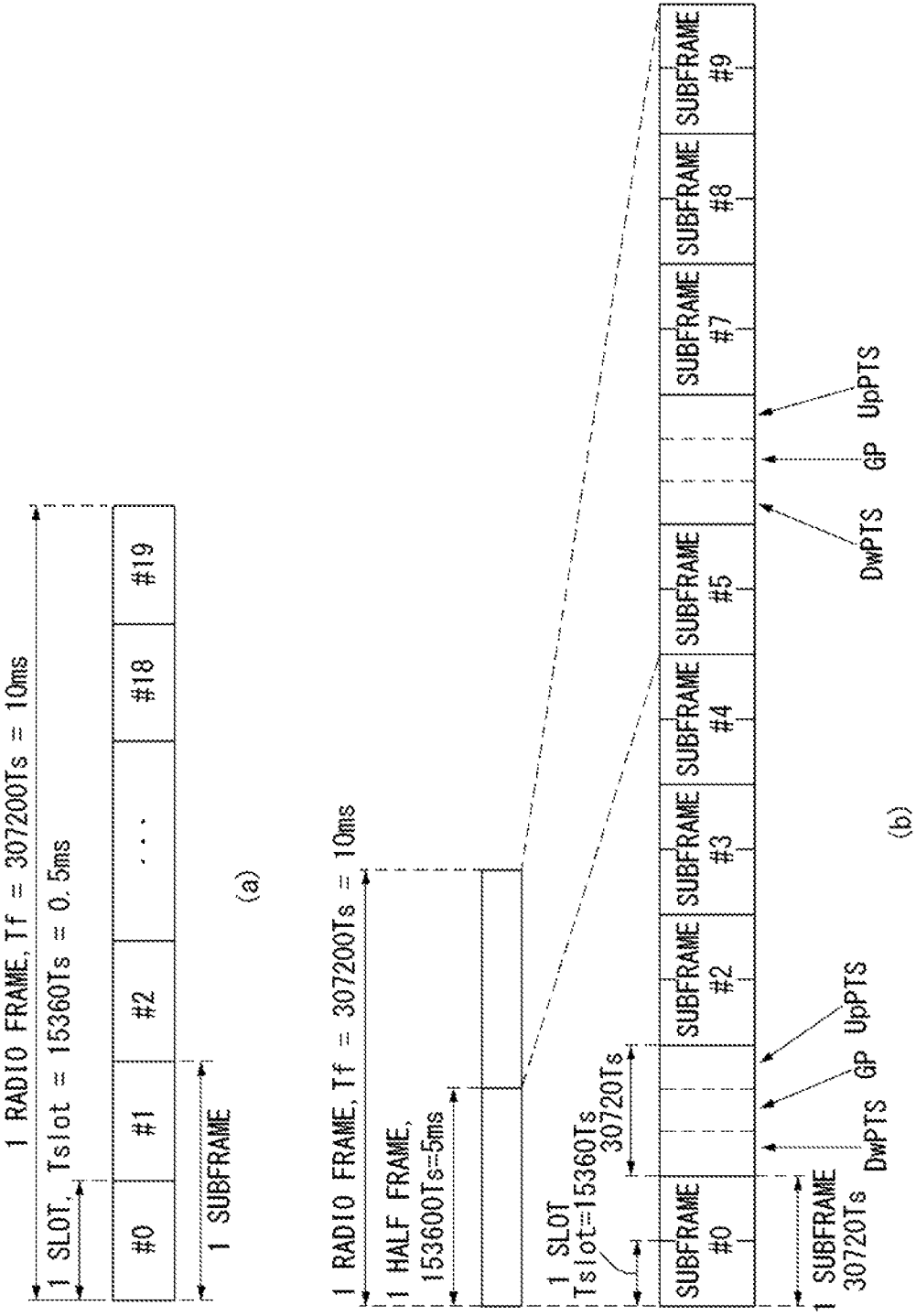

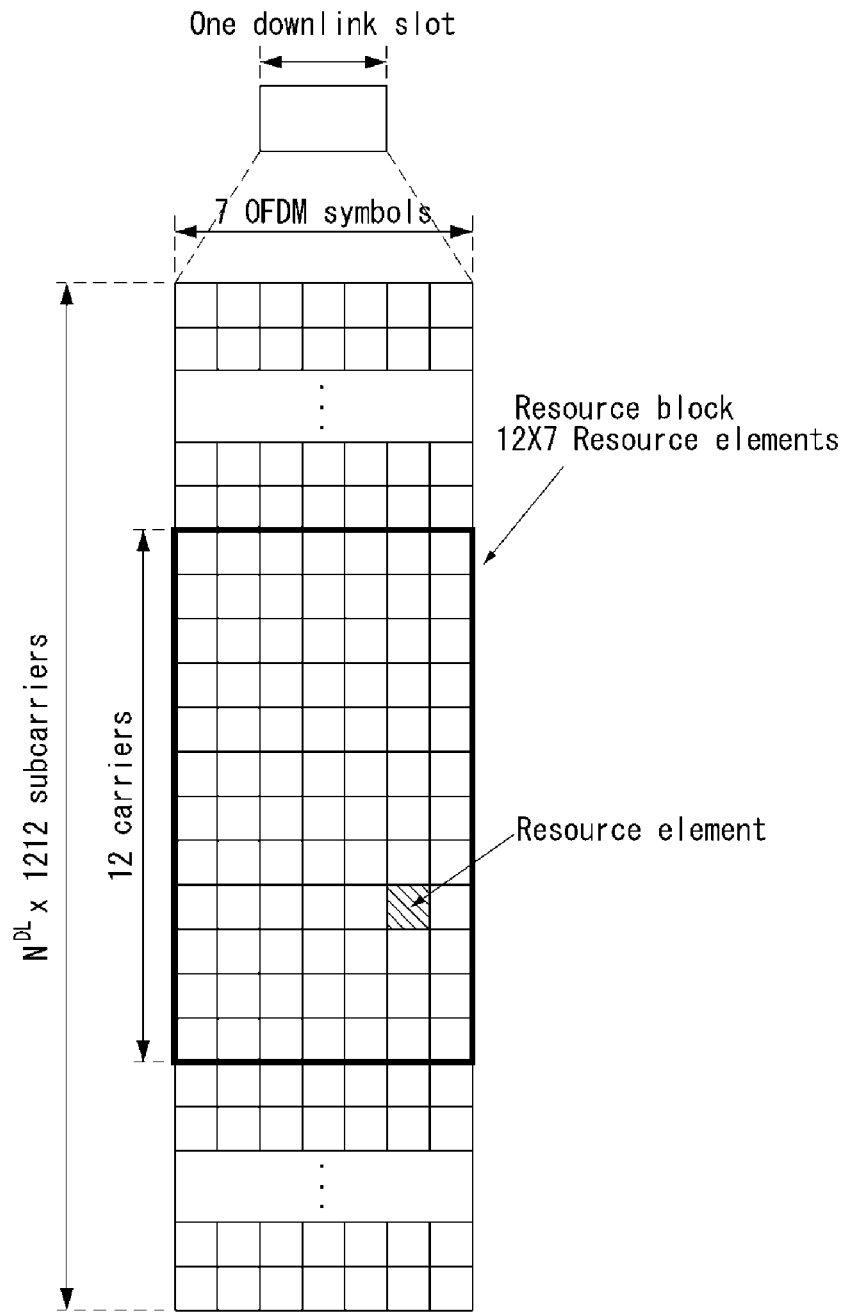
[Fig. 2]

[Fig. 3]
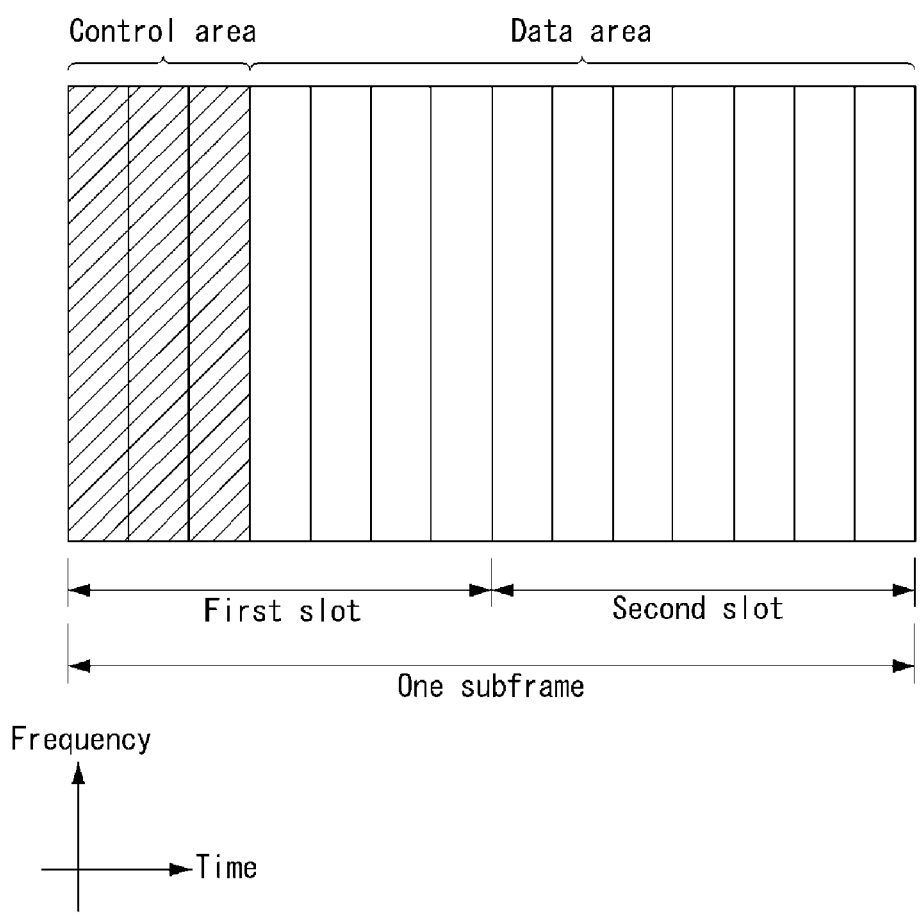

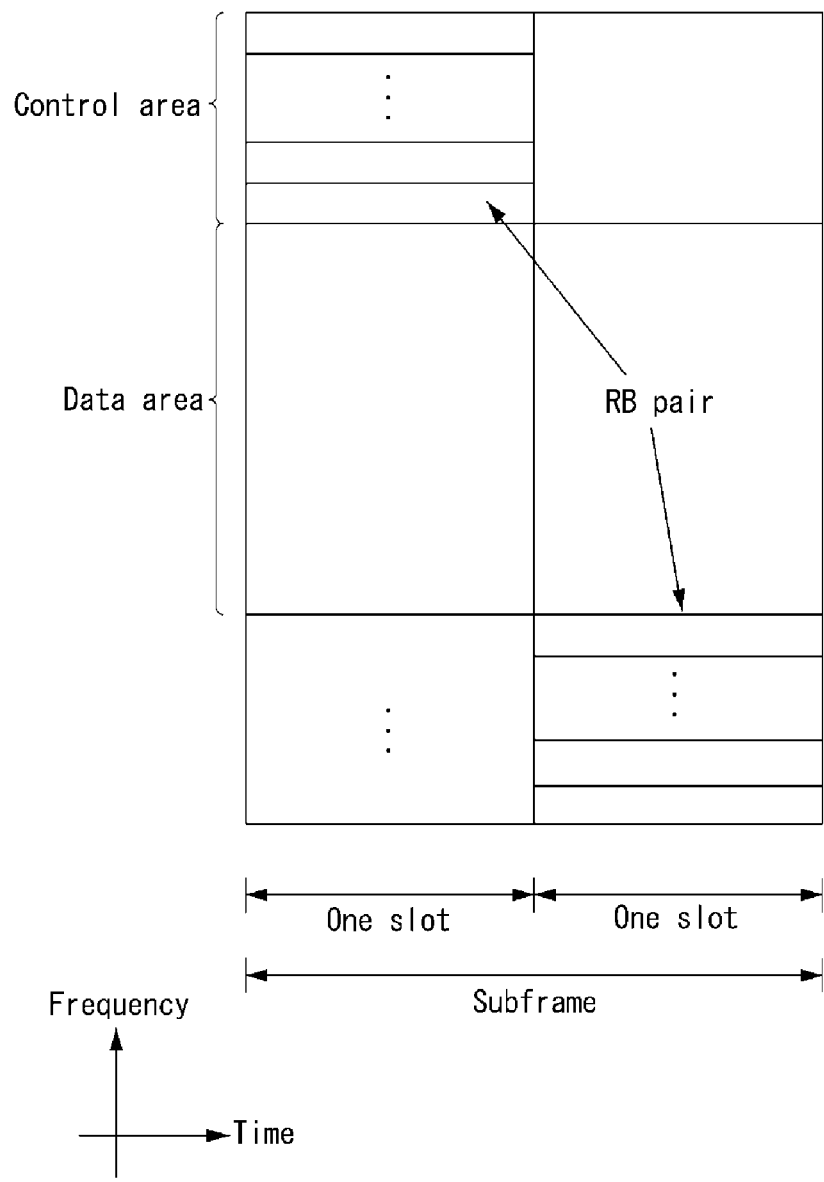
[Fig. 4]

[Fig. 5]
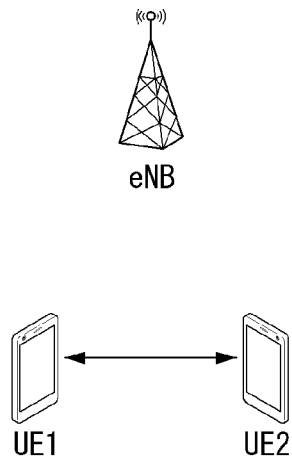
[Fig. 6]
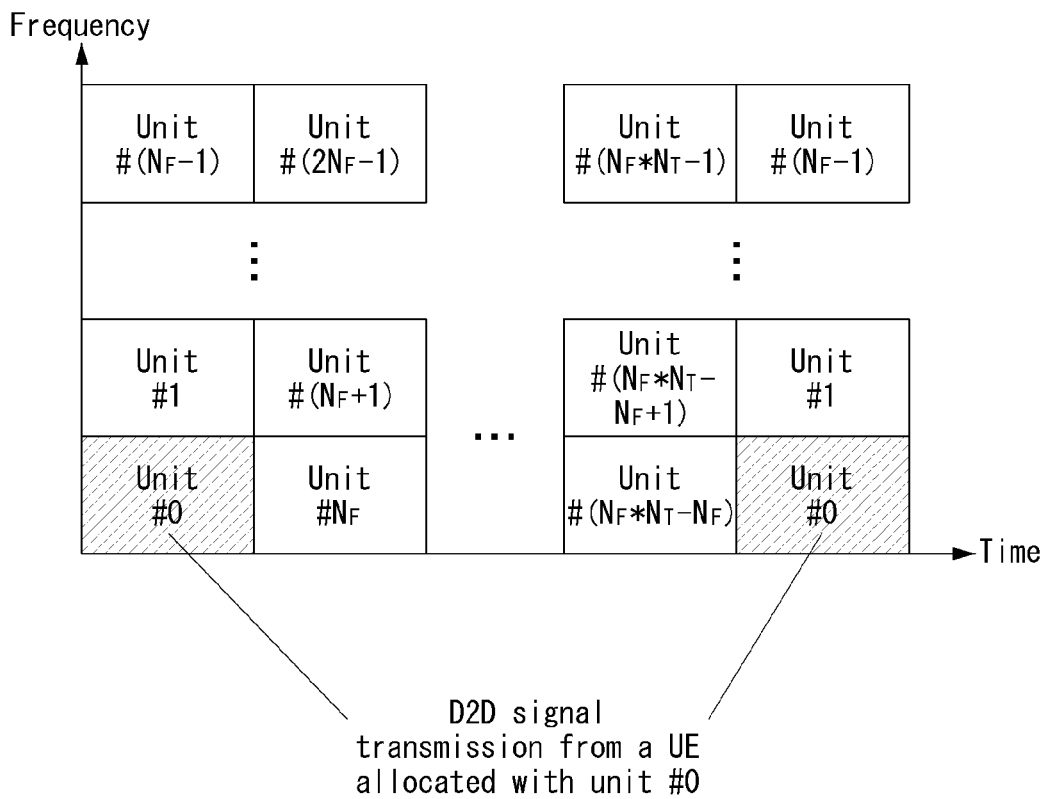

[Fig. 7]
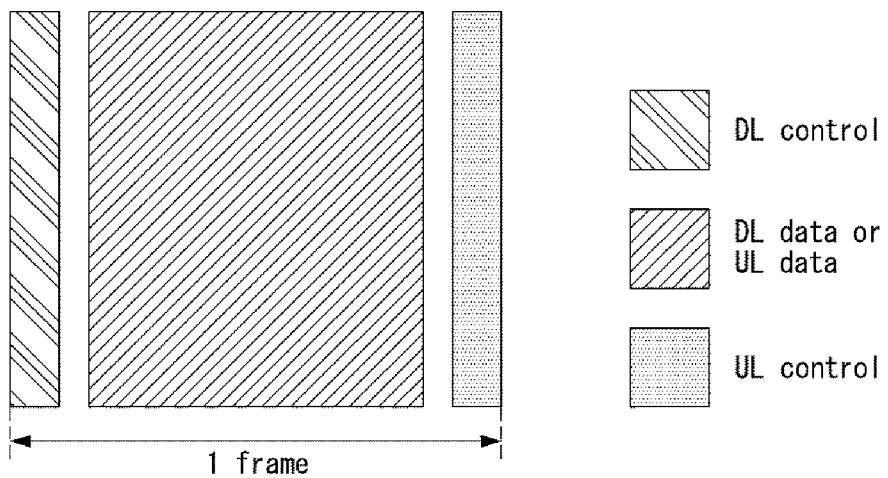

[Fig. 8]
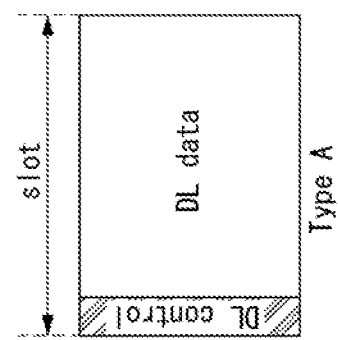
Type A
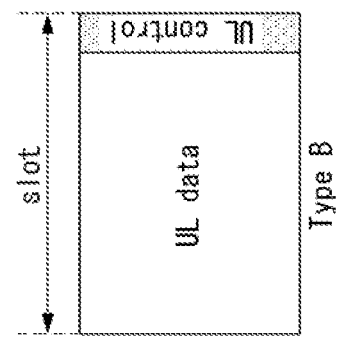
Type B
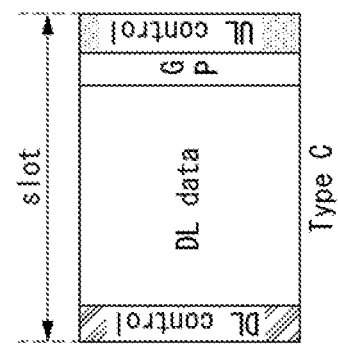
Type C
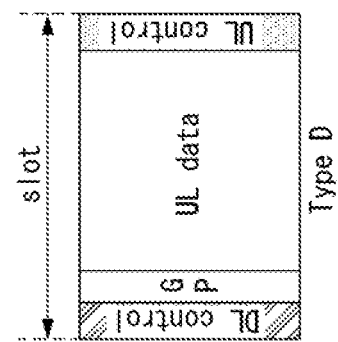
Type D

【Fig. 9】
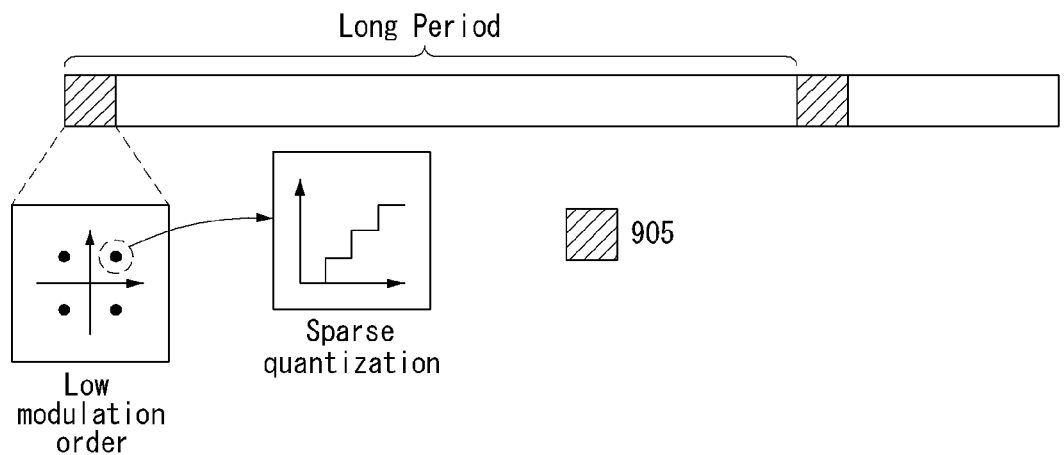
【Fig. 10】
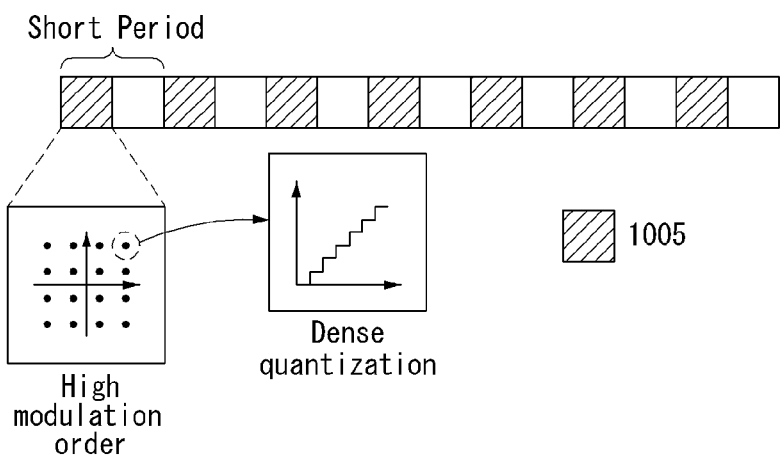

[Fig. 11]
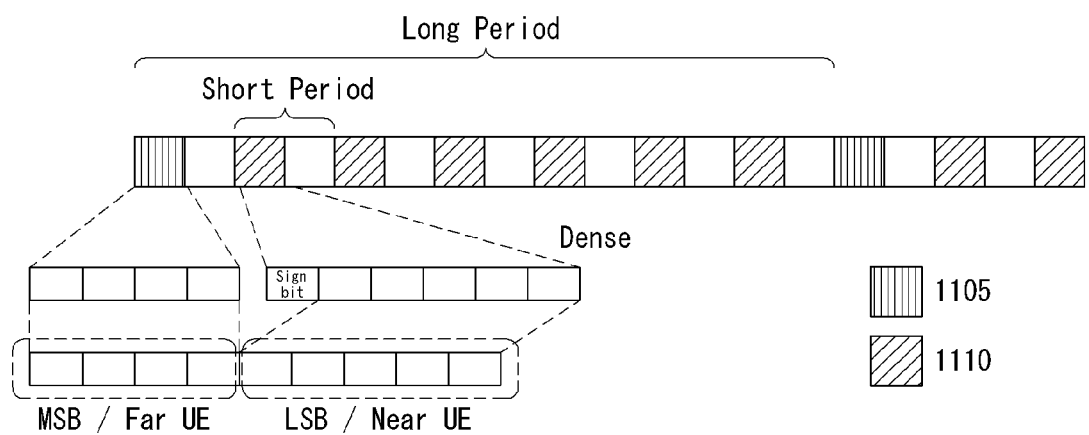
[Fig. 12]
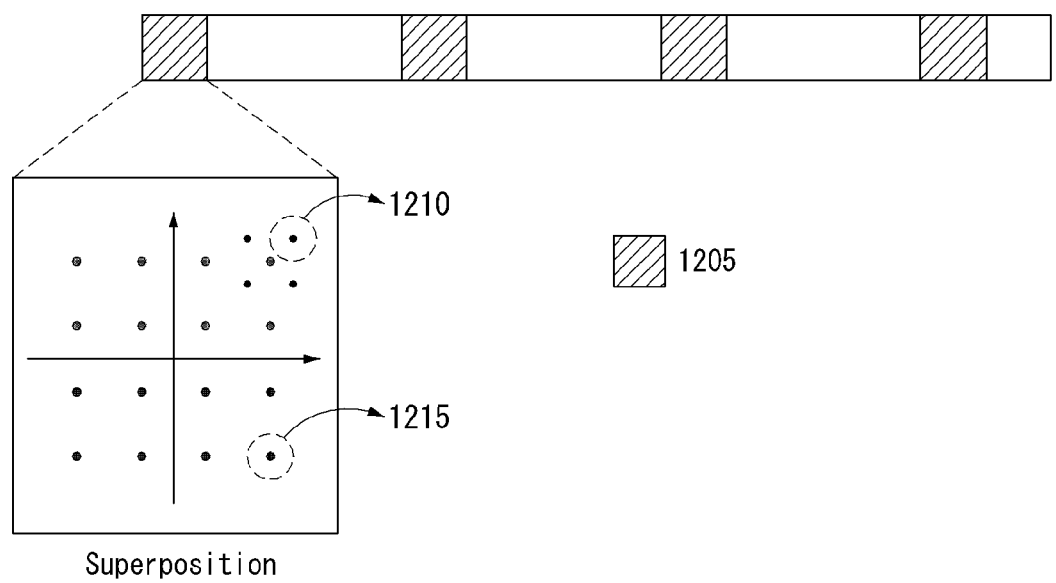

[Fig. 13]
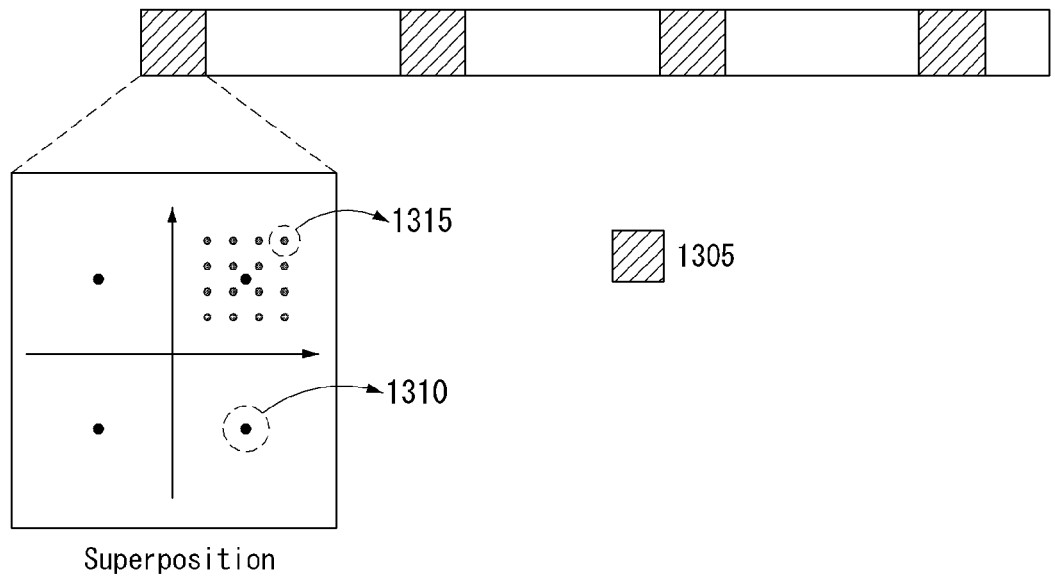
Superposition
[Fig. 14]
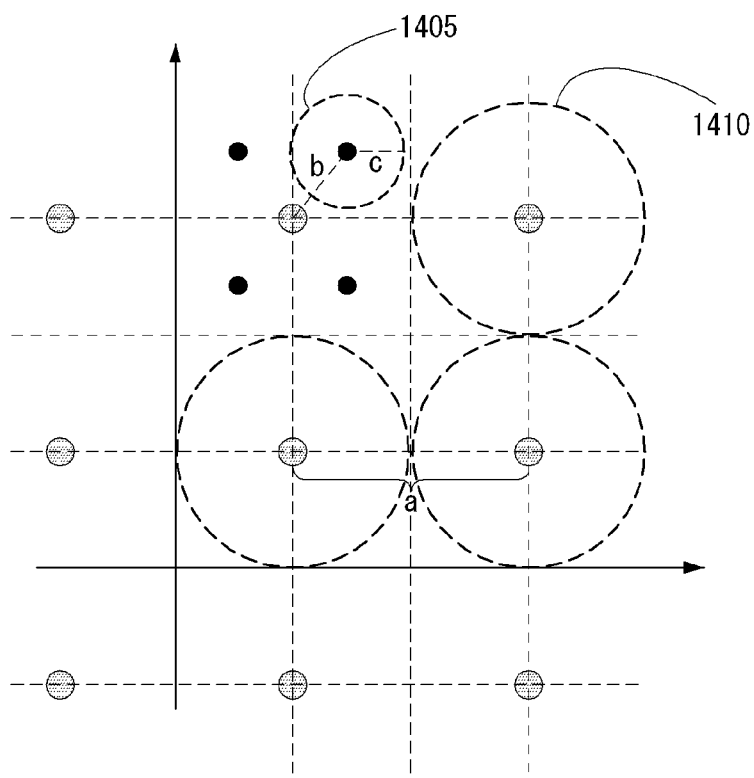

[Fig. 15]
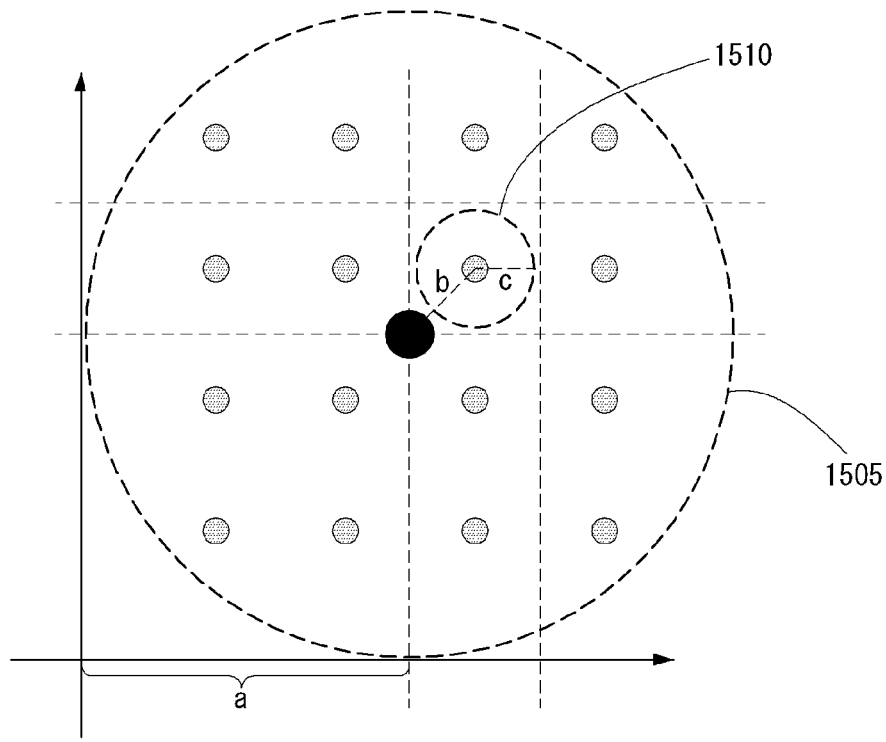
[Fig. 16]
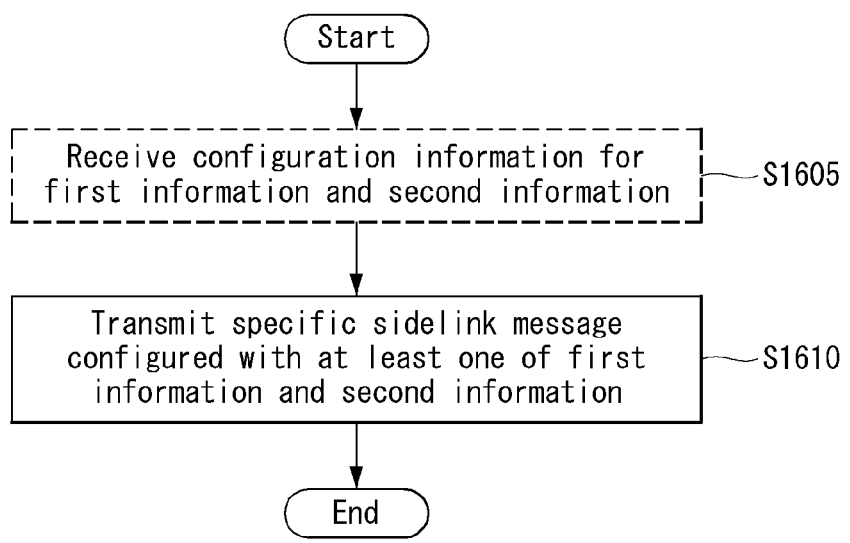

[Fig. 17]
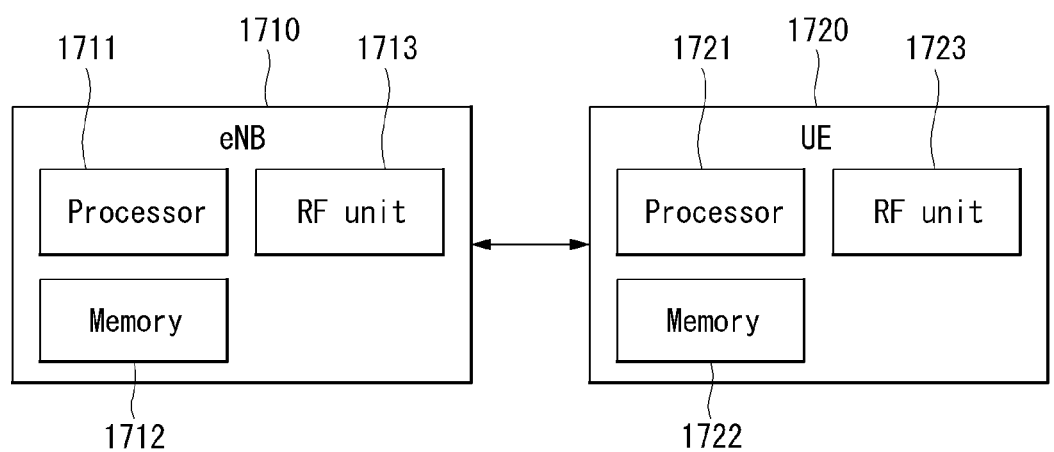

[Fig. 18]
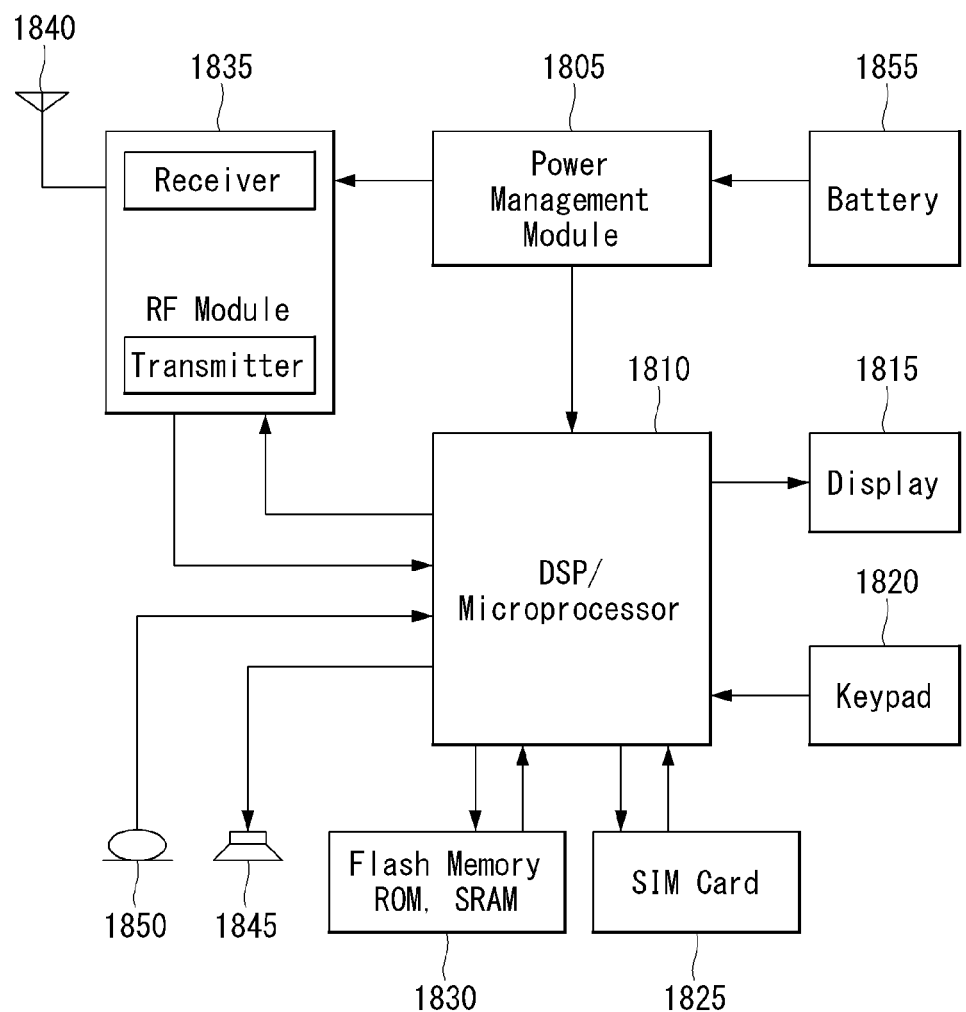

METHOD AND DEVICE FOR PERFORMING SIDELINK COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2018/010510, filed on Sep. 7, 2018, which claims the benefit of U.S. Provisional Application No. 62/555,679, filed on Sep. 8, 2017, the contents of which are all hereby incorporated by reference herein in their entirety.

TECHNICAL FIELD

The present disclosure relates to a wireless communication system and, more particularly, to a method of transmitting or receiving distance- and/or location-related information of a terminal in performing sidelink communication and an apparatus supporting the same.

BACKGROUND ART

Mobile communication systems have been developed to provide voice services while guaranteeing user activities. The mobile communication system has expanded its services to data service in addition to voice. Today the shortage of resources is caused due to an explosive increase of traffic. There is a need for a more advanced mobile communication system because users want higher-speed services.

Requirements for a next-generation mobile communication system basically include the handling of explosive data traffic, a significant increase in the per-user transmission rate, the accommodation of a significantly increased number of connected devices, very low end-to-end latency, and the support of high energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

The present disclosure proposes a method and apparatus for performing, by a terminal, sidelink communication in a wireless communication system.

Specifically, the present disclosure proposes a method and apparatus for efficiently transmitting or receiving distance- and/or location-related information of terminals between terminals located at a short distance and/or terminals located at a long distance.

Technical objects to be achieved in the disclosure are not limited to the aforementioned technical objects, and other technical objects not described above may be evidently understood by a person having ordinary skill in the art to which the disclosure pertains from the following description.

Technical Solution

According to an embodiment of the disclosure, there is provided a method of performing, by a first terminal, sidelink communication in a wireless communication system. The method includes transmitting, to a second terminal, a specific sidelink message configured with at least one of first information and second information. A transmission period of the first information may be set to be longer than a transmission period of the second information. A first modulation order to be applied to the first information may be set differently from a second modulation order of the second information. If the first information and the second information are simultaneously transmitted through the specific sidelink message, modulation symbols of the first information and modulation symbols of the second information may be mapped by considering a requirement noise ratio for each of the first modulation order and the second modulation order.

Furthermore, in the method according to an embodiment of the disclosure, the first information may be at least one upper bit configuring the specific sidelink message, and the second information may be at least one lower bit configuring the specific sidelink message.

Furthermore, in the method according to an embodiment of the disclosure, the first information may be most significant bit (MSB) information configuring the specific sidelink message, and the second information may be least significant bit (LSB) configuring the specific sidelink message.

Furthermore, in the method according to an embodiment of the disclosure, the first modulation order may be set to be smaller than the second modulation order.

Furthermore, in the method according to an embodiment of the disclosure, the first information may be modulated according to a quadrature phase shift keying (QPSK) scheme, and the second information may be modulated according to a 16-quadrature amplitude modulation (16-QAM) scheme.

Furthermore, in the method according to an embodiment of the disclosure, whether to transmit the first information and whether to transmit the second information may be determined based on a distance between the first terminal and the second terminal.

Furthermore, in the method according to an embodiment of the disclosure, the specific sidelink message may include at least one of distance-related information between the first terminal and the second terminal or location-related information of the first terminal.

Furthermore, the method according to an embodiment of the disclosure may further include receiving, from a base station, configuration information for the transmission period and first modulation order of the first information and configuration information for the transmission period and second modulation order of the second information through higher layer signaling.

Furthermore, in the method according to an embodiment of the disclosure, the first information may be transmitted through a resource allocated for transmission of sidelink control information, and the second information may be transmitted through a resource allocated for transmission of sidelink data.

Furthermore, in the method according to an embodiment of the disclosure, the requirement noise ratios may be set based on the shortest distance between modulation symbol of the first information, the shortest distance between modulation symbols of the second information, and the shortest distance between a modulation symbol of the first information and a modulation symbol of the second information.

According to an embodiment of the disclosure, there is provided a first terminal performing sidelink communication in a wireless communication system. The first terminal includes a transceiver for transmitting or receiving a radio signal and a processor functionally connected to the transceiver. The processor may be controlled to transmit, to a second terminal, a specific sidelink message configured with at least one of first information and second information. A transmission period of the first information may be set to be longer than a transmission period of the second information. A first modulation order to be applied to the first information may be set differently from a second modulation order of the second information. If the first information and the second information are simultaneously transmitted through the specific sidelink message, modulation symbols of the first information and modulation symbols of the second information are mapped by considering a requirement noise ratio for each of the first modulation order and the second modulation order.

Furthermore, in the terminal according to an embodiment of the disclosure, the first information may be at least one upper bit configuring the specific sidelink message, and the second information may be at least one lower bit configuring the specific sidelink message.

Furthermore, in the terminal according to an embodiment of the disclosure, the first information may be most significant bit (MSB) information configuring the specific sidelink message, and the second information may be least significant bit (LSB) configuring the specific sidelink message.

Furthermore, in the terminal according to an embodiment of the disclosure, the first modulation order may be set to be smaller than the second modulation order.

Furthermore, in the terminal according to an embodiment of the disclosure, whether to transmit the first information and whether to transmit the second information are determined based on a distance between the first terminal and the second terminal.

Advantageous Effects

According to an embodiment of the disclosure, there is an effect in that a sidelink message can be efficiently transmitted because the period and element (or configuration) of transmission is differently set and transmitted based on the type of information in performing sidelink communication.

Effects which may be obtained in the disclosure are not limited to the aforementioned effects, and other technical effects not described above may be evidently understood by a person having ordinary skill in the art to which the disclosure pertains from the following description.

DESCRIPTION OF DRAWINGS

The accompany drawings, which are included as part of the detailed description in order to help understanding of the disclosure, provide embodiments of the disclosure and describe the technical characteristics of the disclosure along with the detailed description.

FIG. 1 illustrates the structure of a radio frame in a wireless communication system to which the present disclosure may be applied.

FIG. 2 is a diagram illustrating a resource grid for one downlink slot in a wireless communication system to which the present disclosure may be applied.

FIG. 3 illustrates the structure of a downlink subframe in a wireless communication system to which the present disclosure may be applied.

FIG. 4 illustrates the structure of an uplink subframe in a wireless communication system to which the present disclosure may be applied.

FIG. 5 is a diagram for describing elements for a direct communication (D2D) scheme between UEs.

FIG. 6 is a diagram illustrating an embodiment of the configuration of a resource unit.

FIG. 7 illustrates a frame format available in an NR system to which the present disclosure may be applied.

FIG. 8 illustrates detailed examples of a frame format available in an NR system to which the present disclosure may be applied.

FIG. 9 illustrates an example of a method of transmitting a sidelink message to which a method proposed in the present disclosure may be applied.

FIG. 10 illustrates another example of a method of transmitting a sidelink message to which a method proposed in the present disclosure may be applied.

FIG. 11 illustrates yet another example of a method of transmitting a sidelink message to which a method proposed in the present disclosure may be applied.

FIG. 12 illustrates an example of a method of transmitting upper bit information and lower bit information to which a method proposed in the present disclosure may be applied.

FIG. 13 illustrates another example of a method of transmitting upper bit information and lower bit information to which a method proposed in the present disclosure may be applied.

FIG. 14 illustrates an example of a method of superposing and mapping modulation symbols to which a method proposed in the present disclosure may be applied.

FIG. 15 illustrates another example of a method of superposing and mapping modulation symbols to which a method proposed in the present disclosure may be applied.

FIG. 16 illustrates an example of an operational flowchart of a UE performing sidelink communication to which a method proposed in the present disclosure may be applied in a wireless communication system.

FIG. 17 illustrates a block diagram of a wireless communication apparatus to which the methods proposed in the present disclosure may be applied.

FIG. 18 illustrates a block diagram of a communication apparatus according to an embodiment of the present disclosure.

MODE FOR INVENTION

Hereinafter, preferred embodiments of the present disclosure will be described in detail with reference to the accompanying drawings. A detailed description to be disclosed below together with the accompanying drawing is to describe embodiments of the present disclosure and not to describe a unique embodiment for carrying out the present disclosure. The detailed description below includes details in order to provide a complete understanding. However, those skilled in the art know that the present disclosure can be carried out without the details.

In some cases, in order to prevent a concept of the present disclosure from being ambiguous, known structures and devices may be omitted or may be illustrated in a block diagram format based on core function of each structure and device.

In the disclosure, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS) or an access point (AP). Further, a "terminal" may be fixed or movable and be substituted with a term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device or a device-to-device (D2D) device.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present disclosure and the use of the specific terms may be modified into other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the present disclosure may be supported by the standard documents disclosed in at least one of IEEE 802, 3GPP, and 3GPP2, that is, wireless access systems. That is, steps or parts not described to definitely show the technical spirit of the present disclosure among the embodiments of the present disclosure may be based on the documents. Further, all terms disclosed in the document may be described by the standard document.

3GPP LTE/LTE-A is primarily described for clear description, but technical features of the present disclosure are not limited thereto.

General System

FIG. 1 illustrates a structure a radio frame in a wireless communication system to which the present disclosure can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T\_f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of $T\_slot=15360*T\_s=0.5$ ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) illustrates the type 2 radio frame structure. The type 2 radio frame structure includes 2 half frames each having a length of $153600*T\_s=5$ ms. Each of the half frames includes 5 subframes each having a length of $30720*T\_s=1$ ms.

In the type 2 radio frame structure of a TDD system, an uplink-downlink configuration is a rule showing how uplink and downlink are allocated (or reserved) with respect to all of subframes. Table 1 represents the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "$T\_slot=15360*T\_s=0.5$ ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 represents a configuration (i.e., the length of a DwPTS/GP/UpPTS) of the special subframe.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present disclosure can be applied.

Referring to FIG. 3, a maximum of three former OFDM symbols in the first slot of the subframe is a control region to which control channels are allocated and residual OFDM symbols is a data region to which a physical downlink shared channel (PDSCH) is allocated. Examples of the downlink control channel used in the 3GPP LTE include a physical control format indicator channel (PCFICH), a physical downlink control channel (PDCCH), a physical hybrid-ARQ indicator channel (PHICH), and the like.

The PCFICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

TABLE 2

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present disclosure can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present disclosure is not limited thereto.

The PDCCH may transport a resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. The format of the PDCCH and the number of bits of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) configured to be specific to a terminal. In other words, as described above, the PDCCH may be transmitted in up to three OFDM symbols in the first slot of a subframe, but the EPDCCH may be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with sidelink shared channel (SL-SCH) and PSCCH Information, and so on. Multiple EPDCCHs may be supported and the terminal may monitor the set of EPCCHs.

The EPDCCH may be transmitted using one or more successive advanced CCEs (ECCEs), and the number of ECCEs per EPDCCH may be determined for each EPDCCH format.

Each ECCE may be composed of a plurality of enhanced resource element groups (EREGs). An EREG is used to define the mapping of ECCE to RE. There are 16 EREGs per PRB pair. All REs are numbered from 0 to 15 in the order in which the frequency increases, except for the RE that carries the DMRS in each PRB pair.

The UE may monitor a plurality of EPDCCHs. For example, one or two EPDCCH sets may be configured in one PRB pair in which the terminal monitors the EPDCCH transmission.

Different coding rates may be realized for the EPOCH by merging different numbers of ECCEs. The EPOCH may use localized transmission or distributed transmission, which may result in different mapping of the ECCE to the REs in the PRB.

FIG. 4 illustrates a structure of an uplink subframe in the wireless communication system to which the present disclosure can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe is allocated to the PUCCH for one terminal. RBs included in the RB pair occupy different subcarriers in two slots, respectively. The RB pair allocated to the PUCCH is frequency-hopped in a slot boundary.

Device-to-Device (D2D) Communication

FIG. 5 is a diagram for describing elements of a D2D (device-to-device) communication technique.

In FIG. 5, a UE means a terminal of a user, but when network equipment such as an eNB transmits and receives a signal according to a communication method with the UE, the corresponding network equipment may also be regarded as a kind of UE. Hereinafter, UE1 may operate to select a resource unit corresponding to a specific resource in a resource pool representing a set of resources and transmit a D2D signal using the corresponding resource unit. UE2, which is a receiving UE, configures a resource pool through which UE1 can transmit a signal, and detects a signal of UE1 within the corresponding pool. Here, the resource pool may be informed by the base station when UE1 is in the connection range of the base station, and may be determined by another UE or determined as a predetermined resource when it is outside the connection range of the base station. In general, a resource pool may include a plurality of resource units, and each UE may select one or a plurality of resource units to use for transmitting their D2D signals.

FIG. 6 is a diagram illustrating an embodiment of a configuration of a resource unit.

Referring to FIG. 6, a total frequency resource is divided into N_F and a total time resource is divided into N_T, so that the total number of N_F*N_T resource units may be defined. In this case, it can be expressed that the resource pool is repeated every N_T subframes. Specifically, one resource unit may be expressed periodically and repeatedly as shown in the figure. Alternatively, in order to obtain a diversity effect in a time or frequency dimension, an index of a physical resource unit to which one logical resource unit is mapped may change in a predetermined pattern according to time. In this resource unit structure, a resource pool may mean a set of resource units that can be used for transmission by a UE that intends to transmit a D2D signal.

The resource pool described above may be subdivided into several types. First, resource pools may be classified according to contents of D2D signals transmitted from each resource pool. As an example, the contents of the D2D signal may be classified as follows, and a separate resource pool may be configured, respectively.

Scheduling assignment (SA): A signal containing information such as a location of a resource for a transmission of a D2D data channel performed by each transmitting UE, a modulation and coding scheme (MCS), or MIMO transmission method, and/or timing advance required for demodulation of other data channels. This signal may be multiplexed and transmitted together with D2D data on the same resource unit, and the SA resource pool in the present disclosure may mean a pool of resources transmitted by multiplexing the SA with D2D data, and another name may be called a D2D control channel.

D2D data channel: A resource pool used by a transmitting UE to transmit user data using resources specified through SA. When it is possible to transmit multiplexed data with D2D data on the same resource unit, the resource pool for the D2D data channel may be a form in which only the D2D data channel having the form except for the SA information is transmitted. In other words, the resource elements used to transmit SA information on individual resource units in the SA resource pool may still be used to transmit D2D data in the D2D data channel resource pool.

Discovery channel: The resource pool for a message that allows a transmitting UE to transmit information, such as its ID, so that a neighboring UE can discover the transmitting UE itself.

Contrary to the above case, even when the content of the D2D signal is the same as each other, different resource pools may be used according to the transmission/reception attributes of the D2D signal. As an example, even in the same D2D data channel or discovery message, based on a transmission timing determination method of a D2D signal (for example, whether it is transmitted at the time of receiving a synchronization reference signal or is transmitted by applying a constant timing advance from the time) or a resource allocation method (for example, whether the eNB assigns transmission resources of an individual signal to an individual transmitting UE or whether an individual transmitting UE selects an individual signaling resource on its own within a pool), a signal format (for example, the number of symbol of each D2D signal occupies in one subframe, or the number of subframes used to transmit one D2D signal), signal strength from eNB, and transmit power strength of the D2D UE, it may be again divided into different resource pools.

In the present disclosure, for convenience of explanation, in D2D or V2V communication, a method in which eNB directly indicates transmission resources of D2D transmitting UE is called/defined as Mode 1 or Mode 3 and a method in which the transmission resource region is set in advance or the eNB assigns the transmission resource region and the UE directly selects the transmission resource is called/defined as Mode 2 or Mode 4. In case of D2D discovery, a case where the eNB directly indicates a resource is called/defined as Type 2 and a case where a UE directly selects a transmission resource in a predetermined resource region or a resource region indicated by the eNB is called/defined as Type 1.

The above-mentioned D2D may be called sidelink, and SA may be called as a physical sidelink control channel (PSCCH), a D2D synchronization signal may be called as a sidelink synchronization signal (SSS), and a control channel that transmits the most basic information before D2D communication and transmitted with SSS may be called a physical sidelink broadcast channel (PSBCH), or another name, a physical D2D synchronization channel (PD2DSCH). A signal for notifying that a specific terminal is in the vicinity thereof, in which case the signal may include an ID of the specific terminal, and this channel may be called a physical sidelink discovery channel (PSDCH).

In Rel. 12 D2D, only a D2D communication UE transmits a PSBCH together with an SSS. Accordingly, the measurement of the SSS is performed using the DMRS of the PSBCH. An out-coverage UE measures the DMRS of the PSBCH, and determines whether it will become a synchronization source by measuring reference signal reference signal received power (RSRP) of the DMRS.

NR System and Related Frame Format

In next-generation communication such as 5G and New Rat (NR), there emerges a need for enhanced mobile broadband communication compared to the existing radio access technology (RAT) because more communication devices require a greater communication capacity.

Furthermore, massive machine type communications (MTC) that provide various services anywhere and at any time by connecting multiple device and things is also one of major issues to be considered in the next-generation communication.

Furthermore, the design or structure of a communication system in which services and/or UEs sensitive to reliability and latency have been considered is being discussed.

As described above, the introduction of the next-generation radio access technology (RAT) in which enhanced mobile broadband (eMBB) communication, massive MTC (mMTC), ultra-reliable and low latency communication (URLLC) have been considered is being discussed. In the present disclosure, the corresponding technology is commonly referred to as a "New RAT(NR)", for convenience sake.

The frame format of an NR system has a form of a self-contained structure in which all of a DL control channel, a DL data channel or an UL data channel, and an UL control channel may be included in one frame unit as in FIG. 7. In this case, the self-contained structure may be referred to as a self-contained slot structure or a self-contained subframe structure.

FIG. 7 illustrates a frame format available in an NR system to which the present disclosure may be applied.

In this case, DL data scheduling information, UL data scheduling information, etc. may be transmitted in the DL control channel. Furthermore, ACK/NACK information for DL data, CSI information (e.g., modulation and coding scheme (MCS) information, MIMO transmission-related information), a scheduling request, etc. may be transmitted in the UL control channel.

In FIG. 7, a time gap for DL-to-UL switching or UL-to-DL switching may be present between a control region and a data region. Furthermore, some of a DL control region, a DL data region, an UL data region and/or an UL control region may not be configured within one frame. Alternatively, the sequence of regions (or channels) configuring one frame may be different.

FIG. 8 illustrates detailed examples of a frame format available in an NR system to which the present disclosure may be applied. FIG. 8 is merely for convenience of description, and the scope of the disclosure is not limited thereto.

Referring to FIG. 8, a frame format which may be considered in the NR system may include four types (i.e., Type A, Type B, Type C, and Type D).

Specifically, the Type A structure may be configured with a DL control region and a DL data region. The Type B structure may be configured with an UL data region and an UL control region. In this case, the UL control region may be omitted depending on a dynamic method.

Furthermore, particularly, as a self-contained structure, the Type C structure may be configured with a DL control region, a DL data region, a guard period (GP) and an UL control region. The Type D structure may be configured with a DL control region, a guard period, an UL data region and an UL control region. In this case, the locations of the UL data region and the UL control region may be changed. The UL control region may be omitted depending on a dynamic method.

Analog Beamforming

In a millimeter wave (mmW), a plurality of antenna elements may be installed in the same area because a wavelength is short.

That is, a wavelength is 1 cm in a 30 GHz band. Accordingly, a total of 64 (8×8) antenna elements may be installed in a 4×4 cm panel in a two-dimensional array form at intervals of 0.5 lambda (wavelength).

Therefore, in the mmW, coverage is increased or throughput is improved by increasing a beamforming (BF) gain using a plurality of antenna element.

In this case, if a transceiver unit (TXRU) is provided in each antenna element to enable transmit power and phase control, independent beamforming is made possible for each frequency resource.

However, there is a problem in that effectiveness is low in the price aspect if the TXRUs are installed in all of 100 antenna elements.

Therefore, a method of mapping a plurality of antenna elements to one TXRU and controlling the direction of a beam using an analog phase shifter is considered.

Such an analog beamforming method has a disadvantage in that frequency selective beamforming cannot be performed because only one beam direction can be formed in a full band.

For such a reason, hybrid BF (HBF) having B TXRUs, that is, a number smaller than Q antenna elements, as a middle form of digital BF and analog BF may be considered.

The HBF is different depending on a method of connecting the B TXRUs and the Q antenna elements, but the direction of beams that may be transmitted at the same time is limited to B or less.

In performing communication (e.g., sidelink communication) between UEs, when the UEs measure a distance and/or location between the UEs, an error of measurement may increase as the distance between the UEs is increased. Alternatively, if a UE transmits, to a far UE, the results of the measurement of the distance between the UE and the far UE or the results of the measurement (or estimation) of its own location or the location of another UE, quality of a signal may be degraded or the signal may be transmitted at a low data rate.

In the present disclosure, a method of efficiently transmitting corresponding information as the distance between UEs is far or near when information related to the distance between UEs and/or locations of the UEs are exchanged by considering the aforementioned description is described.

Specifically, the present disclosure proposes a method of transmitting distance- and/or location-related information of UEs that are far away (hereinafter a first embodiment), a method of transmitting distance- and/or location-related information of UEs that are closely located (hereinafter a second embodiment), and a method of selecting or combining the two methods (hereinafter a third embodiment).

In this case, in order to distinguish between a case where the distance between UEs is distant and a case where the distance between UEs is close in the present disclosure, a preset threshold value may be used. That is, when the distance between UEs is a preset threshold value or less (or less than the threshold value), this may mean that the distance between the UEs is close. When the distance between UEs is a preset threshold value or more (or more than the threshold value), this may mean that the distance between the UEs is distant.

Hereinafter, methods described in embodiments of the present disclosure are described based on the transmission and reception of distance and/or location information between UEs, but may also be extended and applied to the transmission and reception of other common information (e.g., quality of service (QoS) information).

First Embodiment

First, a method of transmitting information related to the distance and/or locations between UEs located at far distances is specifically described.

When information is transmitted between UEs that are far away from each other, it may be inefficient to frequently transmit a lot of information because the quality of a signal may be degraded. In this case, it may be more preferentially necessary to check how far the UEs are located approximately at least or where the UEs are located (e.g., large scale information) rather than to precisely check a mutual distance or a counterpart's location.

Accordingly, a message (e.g., distance- and/or location-related signal or message) having a far UE as the target of reception may be configured to be transmitted through the following methods. A resource used in this case may be referred to as a first resource for the transmission of distance- and/or location-related information.

The following methods have been classified for convenience of description, and they may be mutually combined or some of elements may be substituted and applied.

Method 1-1)

In the case of the transmission and reception of information between UEs that are far away from each other, the UE may be configured to transmit measured results every long period. For example, the UE may be configured to transmit measured results every 1000 ms.

In sidelink communication, when sidelink data between UEs is periodically transmitted, a message (i.e., first message) transmitted every period (i.e., first period) may be configured, and a message (i.e., second message) transmitted every n-times period (i.e., second period) may be configured. In this case, a distance- and/or location-related message having a far UE as the target of reception may be the second message transmitted every second period.

That is, the corresponding message (or information) may be configured to be transmitted in a longer period than another message by a UE.

Method 1-2)

Furthermore, in the case of the transmission and reception of information between UEs that are far away from each other, the UE may be configured to sparsely quantize and transmit (e.g., 10 m resolution) a transmitted message (or information). Alternatively, the UE may be configured to transmit only a part (e.g., an upper bit or the most significant bit (MSB)) of measured or reported distance- and/or location-related information.

In this case, if detailed information and/or distance and/or location information (e.g., distance information of less than 10 m) for the remaining part (e.g., a lower bit or the least significant bit (LSB)) is necessary, the UE may obtain corresponding information through another channel and/or resource.

Method 1-3)

Furthermore, in the case of the transmission and reception of information between UEs that are far away from each other, the UE may be configured to transmit measured (or reported) information with low spectral efficiency.

For example, a UE may be configured to modulate and transmit distance- and/or location-related information having a far UE as the target of reception using a modulation scheme (e.g., binary phase shift keying (BPSK) or quadrature phase shift keying (QPSK)) of a low order.

Method 1-4)

Furthermore, in the case of the transmission and reception of information between UEs that are far away from each other, the UE may be configured to transmit information using smaller resources compared to the transmission and reception of information between UEs that are closely located. That is, the UE may transmit a message (or information) having a far UE as the target of reception through smaller resources compared to a case where a near UE is the target of reception.

For example, the corresponding message may be transmitted through a control channel (e.g., scheduling assignment (SA) channel) for a sidelink or all or some of data channels.

As described above, some or all of the aforementioned methods 1) to 4) may be combined and used, and may be represented like FIG. 9.

FIG. 9 illustrates an example of a method of transmitting a sidelink message to which a method proposed in the present disclosure may be applied. FIG. 9 is merely for convenience of description, and does not limit the scope of the present disclosure.

Referring to FIG. 9, a case where a UE transmits a message or information to a far UE, that is, the target of reception is assumed. In this case, a region 905 may mean a resource used to transmit the corresponding message or information among sidelink resources. As illustrated in FIG. 9, the corresponding message or information may be transmitted through an allocated resource based on a long period.

Specifically, information having a far UE as the target of reception may be modulated and mapped with a low modulation order (e.g., QPSK). Furthermore, as described above, the corresponding information may be sparsely quantized.

Second Embodiment

Next, a method of transmitting distance- and/or location-related information of a UE between UEs that are closely located each other is specifically described.

When information is transmitted between UEs that are closely located, there is no possibility that quality of a signal is greatly degraded. Accordingly, a large amount of information may be frequently transmitted because the propagation loss or path loss of a signal may not be great. In this case, it may be further necessary to precisely check a mutual distance or a counterpart's location (e.g., small scale information).

Accordingly, a message (e.g., distance- and/or location-related signal or message) having a near UE as the target of reception may be configured to be transmitted through the following methods. A resource used in this case may be referred to as a second resource for the transmission of distance- and/or location-related information.

The following methods have been classified for convenience of description, and they may be combined or some element thereof may be substituted and applied.

Method 2-1)

In the case of the transmission and reception of information between UEs that are closely located, the UE may be configured to transmit measured results every short period. For example, a UE may be configured to transmit measured results every 100 ms or in a shorter period than 100 ms if the mobility of a UE is great or if higher measurement precision is necessary.

In sidelink communication, when sidelink data between UEs is periodically transmitted, a message (i.e., first message) transmitted every period (i.e., first period) may be configured, and a message (i.e., second message) transmitted every n-time period (i.e., second period) may be configured. In this case, a distance- and/or location-related message having a near UE as the target of reception may be the first message transmitted every first period.

That is, the corresponding message (or information) may be configured to be transmitted in a shorter period than another message (e.g., message described in the first embodiment) by a UE.

Method 2-2)

Furthermore, in the case of the transmission and reception of information between UEs that are closely located, the UE may be configured to densely quantize and transmit (e.g., 1 m resolution or 0.1 m resolution) a transmitted message (or information). Alternatively, the UE may be configured to transmit only a part (e.g., a lower bit or the least significant bit (LSB)) of measured or reported distance- and/or location-related information.

In this case, if sparse information and/or distance and/or location information (e.g., distance information of 10 m or more) for the remaining part (e.g., an upper bit or the most significant bit (MSB)) is necessary, the UE may obtain the corresponding information through another channel and/or resource.

Method 2-3)

Furthermore, in the case of the transmission and reception of information between UEs that are closely located, the UE may be configured to transmit measured (or reported) information with high spectral efficiency.

For example, a UE may be configured to modulate distance- and/or location-related information having a near UE as the target of reception using a high-order modulation method (e.g., 16-quadrature amplitude modulation (QAM)) and transmit the information.

Method 2-4)

Furthermore, in the case of the transmission and reception of information between UEs that are closely located, the UE may be configured to transmit information using more resources compared to the transmission and reception of information between UEs that are far away from each other. That is, the UE may transmit a message (or information) having a near UE as the target of reception using a larger number of resources compared to a case where a far UE is the target of reception.

For example, the corresponding message may be transmitted through some or all of the regions of a data channel for a sidelink.

As described above, some or all of the aforementioned methods 1) to 4) may be combined and used, which may be represented like FIG. 10.

FIG. 10 illustrates another example of a method of transmitting a sidelink message to which a method proposed in the present disclosure may be applied. FIG. 10 is merely for convenience of description, and does not limit the scope of the present disclosure.

Referring to FIG. 10, a case where a UE transmits a message or information having a near UE as the target of reception is assumed. In this case, a region 1005 may mean a resource used to transmit the corresponding message or information among sidelink resources. As illustrated in FIG. 10, the corresponding message or information may be transmitted through an allocated resource based on a short period.

Specifically, information having a near UE as the target of reception may be modulated and mapped with a high modulation order (e.g., 16-QAM). Furthermore, as described above, the corresponding information may be densely quantized.

Third Embodiment

In the present embodiment, a method of selecting or combining and using the methods described in the first embodiment and the second embodiment is specifically described.

First, the two methods described in the aforementioned embodiments may be selected or combined and used depending on the distance between UEs.

For example, when a value of a measured distance between UEs is "X" m (e.g., 150 m) or more, a transmission method (i.e., the method described in the first embodiment) including a far UE as the target of reception may be configured to be used. In contrast, when a value of a measured distance between UEs is less than "X" m, a transmission method (i.e., the method described in the second embodiment) including a near UE as the target of reception may be configured to be used.

In this case, the value "X" may be predefined on a system or may be transmitted through a physical channel or a system information block (SIB) message. Alternatively, information on the value "X" may be indicated by a base station through higher layer signaling (e.g., RRC signaling).

Alternatively, the two methods described in the aforementioned embodiments may be selected or combined and used to transmit a specific distance and/or location value regardless of the distance between UEs. In this case, the following methods may be considered. The following methods have been classified for convenience of description, and they may be combined or some element thereof may be substituted and applied.

Method 3-1)

A UE may be configured to transmit information (e.g., MSB information) of an upper bit every long period and to transmit and/or update information (e.g., LSB information) of a lower bit every short period.

FIG. 11 illustrates yet another example of a method of transmitting a sidelink message to which a method proposed in the present disclosure may be applied. FIG. 11 is merely for convenience of description, and does not limit the scope of the present disclosure.

Referring to FIG. 11, a case where a UE classifies and transmits upper bit information and lower bit information in different periods is assumed. In this case, a region 1105 indicates a resource in which the upper bit information is transmitted in a long period. A region 1110 indicates a region in which the lower bit information is transmitted in a short period.

In this case, the upper bit information may be information having a UE at a far distance as the target of reception. The lower bit information may be information having a UE at a near distance as the target of reception.

In this case, information carried on (i.e., mapped to) the lower bit (e.g., LSB) may be a positive value, 0 or a negative value. In this case, the information transmitted every short period may be an absolute value of the lower bit or a change of the lower bit.

Furthermore, a symbol bit (i.e., sign bit) may be transmitted in the lower bit part (e.g., LSB part), if necessary. The sign bit may mean a bit for indicating a positive or negative number.

Method 3-2)

Furthermore, a UE may be configured to superpose and transmit the aforementioned upper bit information (e.g., MSB information) and the lower bit information (e.g., LSB information).

For example, the upper bit information (e.g., MSB information) and the lower bit information (e.g., LSB information) may be modulated and mapped in different modulation orders like FIG. 12.

FIG. 12 illustrates an example of a method of transmitting upper bit information and lower bit information to which a method proposed in the present disclosure may be applied. FIG. 12 is merely for convenience of description, and does not limit the scope of the present disclosure.

Referring to FIG. 12, a region 1205 indicates a resource region in which upper bit information and/or lower bit information is transmitted. A symbol 1210 means a modulation symbol for the upper bit information. A symbol 1215 means a modulation symbol for the lower bit information. In this case, the symbol 1210 may be the modulation symbol of information having a UE located at a far distance as the target of reception. The symbol 1215 may be the modulation symbol of information having a near UE as the target of reception.

In this case, a UE may modulate the upper bit information in a low modulation order using low power, may modulate the lower bit information in a high modulation order using high power, and may superpose and transmit the information. For example, as illustrated in FIG. 12, the symbol 1210 for the upper bit information may be modulated according to a QPSK scheme. The symbol 1215 for the lower bit information may be modulated according to the 16-QAM scheme. The symbols may be superposed and mapped.

For another example, the upper bit information (e.g., MSB information) and the lower bit information (e.g., LSB information) may be modulated and mapped in different modulation orders like FIG. 13.

FIG. 13 illustrates another example of a method of transmitting upper bit information and lower bit information to which a method proposed in the present disclosure may be applied. FIG. 13 is merely for convenience of description, and does not limit the scope of the present disclosure.

Referring to FIG. 13, a region 1305 indicates a resource region in which upper bit information and/or lower bit information is transmitted. A symbol 1310 means a modulation symbol for the upper bit information. A symbol 1315 means a modulation symbol for the lower bit information. In this case, the symbol 1310 may be the modulation symbol of information having a UE located at a far distance as the target of reception. The symbol 1315 may be the modulation symbol of information having a near UE as the target of reception.

In this case, the UE may modulate the upper bit information in a low modulation order using high power, may modulate the lower bit information in a high modulation order using low power, and may superpose and transmit the information. For example, as illustrated in FIG. 13, the symbol 1310 for the upper bit information may be modulated according to the QPSK scheme. The symbol 1315 for the lower bit information may be modulated according to the 16-QAM scheme. The symbols may be superposed and mapped.

Method 3-3)

Furthermore, a UE may be configured to transmit the aforementioned upper bit information through a first resource (e.g., control information resource or SA resource) and to transmit the aforementioned lower bit information through a second resource (e.g., data resource). For example, if upper bit information and lower bit information configuring a message for the distance between UEs and/or the location of a UE are present, the upper bit information and the lower bit information may be transmitted through resource regions configured for different usages.

Furthermore, as described above, the aforementioned methods 3-1) to 3-3) may be coupled or combined or used. For example, Method 3-1) and Method 3-2) may be combined. The superposition method described in Method 3-2) may be applied to a resource in which MSB information and LSB information are simultaneously transmitted. The LSB may be transmitted in a region in which only LSB information is transmitted in a short period as described in Method 3-1).

Specifically, a case where multiple instances are configured for the transmission of MSB information and/or the transmission of LSB information is assumed. In this case, MSB information and LSB information may be transmitted at a specific instance(s) based on a long period at the same time. LSB information may be transmitted at the remaining instance(s) (i.e., an instance(s) according to a short period). In this case, the method of Method 3-2) may be applied to a simultaneously transmitted instance(s). The method of Method 3-1) may be applied to the remaining instance(s).

Alternatively, the distance between UEs located near a specific UE and the distance between UEs located far from a specific UE may be superposed and transmitted.

In this case, in order to distinguish between a case where the distance between the UEs is near and a case where the distance between the UEs is far, a preset threshold value may be used. That is, if the distance between the UEs is the preset threshold value or less (or less than the threshold value), this may mean that the distance between the UEs is near. If the distance between the UEs is the preset threshold value or more (or more than the threshold value), this may mean that the distance between the UEs is far.

In this case, the methods described in the present embodiment may be used or the following methods may be additionally applied.

First, as in FIG. 11, a UE may be configured to transmit distance information for a far UE every long period and to transmit distance information for a near UE every short period.

Furthermore, the UE may be configured to superpose and transmit the distance information for the far UE and the distance information for the near UE.

For example, as in FIG. 12, the UE may modulate the distance information for the far UE in a low modulation order using low power, may modulate the distance information for the near UE in a high modulation order using high power, and may superpose and transmit the distance information.

For another example, as in FIG. 13, the UE may modulate the distance information for the far UE in a low modulation order using high power, may modulate the distance information for the near UE in a high modulation order using low power, and may superpose and transmit the distance information.

In this case, in using the aforementioned superposition method, the range of power for transmitting each signal and a valid noise ration, that is, a requirement noise ratio (e.g., a signal to noise ratio (SNR) or a signal to interference-plus-noise ratio (SINR)) may be differently set compared to the existing method. In this case, the existing method may mean a method of not superposing and transmitting signals.

For example, in the existing method, in the case of QPSK transmission, if an SNR and/or SINR of about 3 dB is secured, the detection of a mapped symbol may be possible or sufficient. Furthermore, in the case of 16-QAM transmission, if an SNR and/or SINR of about 9.9 dB is secured, the detection of a mapped symbol may be possible or sufficient. In this case, a coding gain, an antenna gain, or various processing gains may have been excluded from an object for consideration.

In contrast, if signals are superposed and transmitted, a higher SNR and/or SINR value may be necessary compared to values in the example. A corresponding value may be influenced by power values or ratios that are superposed and transmitted.

Hereinafter, a method of setting an SNR value and/or an SINR value in the case of FIGS. 12 and 13 is described with reference to FIGS. 14 and 15.

FIG. 14 illustrates an example of a method of superposing and mapping modulation symbols to which a method proposed in the present disclosure may be applied. FIG. 14 is merely for convenience of description, and does not limit the scope of the present disclosure.

In FIG. 14, a region 1405 is a region for a modulation symbol (e.g., the symbol 1210) for the upper bit information described in FIG. 12. The region may indicate the range of noise permissible in the superposition method. Furthermore, a region 1410 is a region for a modulation symbol (e.g., the symbol 1215) for the lower bit information described in FIG. 12. The region may indicate the range of noise permissible in the existing method (i.e., the existing modulation method).

In this case, "a" means the shortest distance between the modulation symbols for the lower bit information, and may mean the radius of the region 1410. Furthermore, "b" may mean the shortest distance between a modulation symbol for the upper bit information and a modulation symbol for the lower bit information. Furthermore, "c" means the half of the shortest distance between modulation symbols for the upper bit information, and may mean the radius of the region 1405.

Referring to FIG. 14, in a superposition method such as FIG. 12, if a UE transmits a signal to a far UE according to the QPSK scheme, a condition $a \geq \sqrt{2}b+2c$ is satisfied. In this case, an SNR and/or an SINR value may be set as $20 \log_{10} b/c$. Furthermore, if a UE transmits a signal to a near UE according to the 16-QAM scheme, an SNR and/or SINR value may be set as $20 \log_{10} \sqrt{10}a/2c$.

For example, if 16-QAM transmission requires 10 dB higher power than QPSK transmission, if the QPSK transmission satisfies an SNR and/or SINR of 10.7 dB and the 16-QAM transmission satisfies an SNR and/or SINR of 20.7 dB, the transmission and detection of signals can be performed normally.

Meanwhile, FIG. 15 illustrates another example of a method of superposing and mapping modulation symbols to which a method proposed in the present disclosure may be applied. FIG. 15 is merely for convenience of description, and does not limit the scope of the present disclosure.

In FIG. 15, a region 1505 is a region for a modulation symbol (e.g., the symbol 1310) for the upper bit information described in FIG. 13. The region may indicate the range of noise permissible in the existing method (i.e., the existing modulation method). Furthermore, a region 1510 is a region for a modulation symbol (e.g., the symbol 1315) for the lower bit information described in FIG. 13. The region may indicate the range of noise permissible in the superposition method.

In this case, "a" means half the shortest distance between modulation symbols for the upper bit information, and may mean the radius of the region 1505. Furthermore, "b" may mean the shortest distance between a modulation symbol for the upper bit information and a modulation symbol for the lower bit information. Furthermore, "c" means half of the shortest distance between modulation symbols for the lower bit information, and may mean the radius of the region 1510.

Referring to FIG. 15, in a superposition method such as FIG. 13, if a UE transmits a signal to a far UE according to the QPSK scheme, a condition $b/\sqrt{2} \geq c$ and $a \geq 3/\sqrt{2}b+c$ is satisfied. In this case, an SNR and/or SINR value may be set as $20 \log_{10} a/c$. Furthermore, if a UE transmits a signal to a near UE according to the 16-QAM scheme, an SINR and/or SINR value may be set as $20 \log_{10} \sqrt{10}b/2c$.

For example, if QPSK transmission requires 4 dB higher power than 16-QAM transmission, if the QPSK transmission satisfies an SNR and/or SINR of 16.3 dB and the 16-QAM transmission satisfies an SNR and/or SINR of 12.3 dB, the transmission and detection of signals can be performed normally.

FIG. 16 illustrates an example of an operational flowchart of a UE performing sidelink communication to which a method proposed in the present disclosure may be applied in a wireless communication system. FIG. 16 is merely for convenience of description, and does not limit the scope of the present disclosure.

Referring to FIG. 16, a case where a UE performs sidelink communication using the method(s) described in the embodiment (particularly, the third embodiment) of the present disclosure is assumed. In this case, for convenience of description, UEs performing sidelink communication may be represented as a first UE and a second UE.

In FIG. 16, a case where the first UE transmits a sidelink message to the second UE is assumed. In this case, the sidelink message transmitted by the first UE may be configured with first information (e.g., the aforementioned upper bit information or MSB information) and/or second information (e.g., the aforementioned lower bit information or LSB information).

The first UE may receive configuration information for the first information and the second information from a base station (through higher layer signaling) (step S1605). For example, the UE may receive, from the base station, configuration information for the transmission period and first modulation order of the first information and configuration information for the transmission period and second modulation order of the second information higher layer signaling.

Alternatively, the configuration for the first information and the second information may be pre-configured on a system. In this case, it may not necessary to receive corresponding configuration information from a base station.

The first UE may transmit, to the second UE, a specific sidelink message configured with at least one of the first information and the second information (step S1610). That is, the first UE may transmit, to the second UE, a sidelink message configured with the first information, a sidelink message configured with the second information, or a sidelink message configured with the first information and the second information.

In this case, the transmission period of the first information is set to be longer than the transmission period of the second information. The first modulation order to be applied to the first information may be set differently from the second modulation order to be applied to the second information. For example, the first information may be modulated according to the QPSK scheme, and the second information may be modulated according to the 16-QAM scheme.

Furthermore, as described above, if the first information and the second information are simultaneously (i.e., in a superposition manner) transmitted through a specific sidelink message, the modulation symbols of the first information and the modulation symbols of the second information may be mapped by considering a requirement noise ratio for each of the first modulation order and the second modulation order.

Furthermore, whether to transmit the first information and whether to transmit the second information may be determined based on the distance between the first UE and the second UE.

Furthermore, the aforementioned specific sidelink message may include at least one of information related to the distance between the first UE and the second UE or information related to the location of the first UE.

Furthermore, the first information may be transmitted through a resource (e.g., SA resource) allocated for the transmission of sidelink control information. The second information may be transmitted through a resource allocated for the transmission of sidelink data.

Furthermore, as in FIG. 14 or 15, the aforementioned requirement noise ratio may be set based on the shortest distance between the modulation symbols of the first information, the shortest distance between the modulation symbols of the second information, and the shortest distance between a modulation symbol of the first information and a modulation symbol of the second information.

General Apparatus to which the Present Disclosure May be Applied

FIG. 17 illustrates a block diagram of a wireless communication apparatus to which the methods proposed in the present disclosure may be applied.

Referring to FIG. 17, a wireless communication system includes a base station 1710 and multiple UEs 1720 located within the area of the base station 1710.

The base station 1710 includes a processor 1711, a memory 1712 and a radio frequency (RF) unit 1713. The processor 1711 implements the functions, processes and/or methods proposed in FIGS. 1 to 16. The layers of a radio interface protocol may be implemented by the processor 1711. The memory 1712 is connected to the processor 1711 and stores various types of information for driving the processor 1711. The RF unit 1713 is connected to the processor 1711 and transmits and/or receives a radio signal.

A UE 1720 includes a processor 1721, a memory 1722 and an RF unit 1723.

The processor 1721 implements the functions, processes and/or methods proposed in FIGS. 1 to 16. The layers of a radio interface protocol may be implemented by the processor 1721. The memory 1722 is connected to the processor 1721 and stores various types of information for driving the processor 1721. The RF unit 1723 is connected to the processor 1721 and transmits and/or receives a radio signal.

The memory 1712, 1722 may be positioned inside or outside the processor 1711, 1721 and may be connected to the processor 1711, 1721 by well-known means.

For example, in order to transmit and receive DL data in a wireless communication system supporting a low latency service, the UE may include the radio frequency (RF) unit for transmitting and receiving radio signals and the processor functionally connected to the RF unit.

Furthermore, the base station 1710 and/or the UE 1720 may have a single antenna or multiple antennas.

FIG. 18 illustrates a block diagram of a communication apparatus according to an embodiment of the present disclosure.

Particularly, FIG. 18 is a diagram illustrating the UE of FIG. 17 more specifically.

Referring to FIG. 18, the UE may include a processor (or digital signal processor (DSP)) 1810, an RF module (or RF unit) 1835, a power management module 1805, an antenna 1840, a battery 1855, a display 1815, a keypad 1820, a memory 1830, a subscriber identification module (SIM) card 1825 (this element is optional), a speaker 1845, and a microphone 1850. Furthermore, the UE may include a single antenna or multiple antennas.

The processor 1810 implements the function, process and/or method proposed in FIGS. 1 to 16. The layers of a radio interface protocol may be implemented by the processor 1810.

The memory 1830 is connected to the processor 1810, and stores information related to an operation of the processor 1810. The memory 1830 may be positioned inside or outside the processor 1810 and may be connected to the processor 1810 by various well-known means.

A user inputs command information, such as a telephone number, by pressing (or touching) a button of the keypad 1820 or through voice activation using the microphone 1850, for example. The processor 1810 receives such command information and performs processing so that a proper function, such as making a phone call to the telephone number, is performed. Operational data may be extracted from the SIM card 1825 or the memory 1830. Furthermore, the processor 1810 may display command information or driving information on the display 1815 for user recognition or convenience.

The RF module 1835 is connected to the processor 1810 and transmits and/or receives RF signals. The processor 1810 delivers command information to the RF module 1835 so that the RF module 1835 transmits a radio signal that forms voice communication data, for example, in order to initiate communication. The RF module 1835 includes a receiver and a transmitter in order to receive and transmit radio signals. The antenna 1840 functions to transmit and receive radio signals. When a radio signal is received, the RF module 1835 delivers the radio signal so that it is processed by the processor 1810, and may convert the signal into a baseband. The processed signal may be converted into audible or readable information output through the speaker 1845.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

Although the method of performing sidelink communication in a wireless communication system according to the present disclosure has been described as being chiefly applied to the 3GPP LTE/LTE-A system, the method may be applied to various wireless communication systems in addition to the 3GPP LTE/LTE-A system.

The invention claimed is:

1. A method of performing, by a first terminal, sidelink communication in a wireless communication system, the method comprising:
    receiving, from a base station, configuration information for a transmission period and a first modulation order of first information and configuration information for a transmission period and a second modulation order of second information through higher layer signaling; and
    transmitting, to a second terminal, a specific sidelink message configured with at least one of the first information or the second information,
    wherein the transmission period of the first information is set to be longer than the transmission period of the second information,
    wherein the first modulation order to be applied to the first information is set differently from a second modulation order of the second information,
    wherein based on the first information and the second information being simultaneously transmitted through the specific sidelink message, modulation symbols of the first information and modulation symbols of the second information are mapped by considering a requirement noise ratio for each of the first modulation order and the second modulation order, and
    wherein the first information is at least one upper bit configuring the specific sidelink message, and the second information is at least one lower bit configuring the specific sidelink message.

2. The method of claim 1,
    wherein the first information is most significant bit (MSB) information configuring the specific sidelink message, and
    wherein the second information is least significant bit (LSB) configuring the specific sidelink message.

3. The method of claim 1, wherein the first modulation order is set to be smaller than the second modulation order.

4. The method of claim 3,
wherein the first information is modulated according to a quadrature phase shift keying (QPSK) scheme, and
wherein the second information is modulated according to a 16-quadrature amplitude modulation (16-QAM) scheme.

5. The method of claim 1, wherein whether to transmit the first information and whether to transmit the second information are determined based on a distance between the first terminal and the second terminal.

6. The method of claim 1, wherein the specific sidelink message includes at least one of distance-related information between the first terminal and the second terminal or location-related information of the first terminal.

7. The method of claim 1,
wherein the first information is transmitted through a resource allocated for transmission of sidelink control information, and
wherein the second information is transmitted through a resource allocated for transmission of sidelink data.

8. The method of claim 1, wherein the requirement noise ratios are set based on a shortest distance between modulation symbol of the first information, a shortest distance between modulation symbols of the second information, and a shortest distance between a modulation symbol of the first information and a modulation symbol of the second information.

9. A first terminal performing sidelink communication in a wireless communication system, the terminal comprising:
a transceiver for transmitting or receiving a radio signal, and
a processor functionally connected to the transceiver,
wherein the processor is controlled to:
receive, from a base station, configuration information for a transmission period and a first modulation order of first information and configuration information for a transmission period and a second modulation order of second information through higher layer signaling, and
transmit, to a second terminal, a specific sidelink message configured with at least one of the first information or the second information,
wherein the transmission period of the first information is set to be longer than the transmission period of the second information,
wherein the first modulation order to be applied to the first information is set differently from a second modulation order of the second information,
wherein based on the first information and the second information being simultaneously transmitted through the specific sidelink message, modulation symbols of the first information and modulation symbols of the second information are mapped by considering a requirement noise ratio for each of the first modulation order and the second modulation order, and
wherein the first information is at least one upper bit configuring the specific sidelink message, and the second information is at least one lower bit configuring the specific sidelink message.

10. The terminal of claim 9,
wherein the first information is most significant bit (MSB) information configuring the specific sidelink message, and
wherein the second information is least significant bit (LSB) configuring the specific sidelink message.

11. The terminal of claim 9, wherein the first modulation order is set to be smaller than the second modulation order.

12. The terminal of claim 9, wherein whether to transmit the first information and whether to transmit the second information are determined based on a distance between the first terminal and the second terminal.

* * * * *